(12) United States Patent
Khodl et al.

(10) Patent No.: US 11,192,718 B2
(45) Date of Patent: Dec. 7, 2021

(54) AUTOMATED ITEM-LEVEL ORDER FULFILLMENT

(71) Applicant: Dematic Corp., Grand Rapids, MI (US)

(72) Inventors: Michael S. Khodl, Ada, MI (US); Philip J. Puite, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 209 days.

(21) Appl. No.: 16/526,166

(22) Filed: Jul. 30, 2019

(65) Prior Publication Data
US 2020/0039748 A1 Feb. 6, 2020

Related U.S. Application Data

(60) Provisional application No. 62/712,684, filed on Jul. 31, 2018.

(51) Int. Cl.
B65G 1/137 (2006.01)
B65G 1/04 (2006.01)
G06Q 10/08 (2012.01)
G06Q 30/06 (2012.01)
G07F 9/00 (2006.01)

(52) U.S. Cl.
CPC ......... B65G 1/1373 (2013.01); B65G 1/0492 (2013.01); B65G 1/1378 (2013.01); G06Q 10/087 (2013.01); G06Q 30/0635 (2013.01); G07F 9/002 (2020.05)

(58) Field of Classification Search
CPC combination set(s) only.
See application file for complete search history.

(56) References Cited

U.S. PATENT DOCUMENTS

| 5,450,929 | A | 9/1995 | Ohgita et al. |
| 8,718,814 | B1 | 5/2014 | Clark et al. |
| 9,315,323 | B2 | 4/2016 | Schubilske |

(Continued)

FOREIGN PATENT DOCUMENTS

| CA | 2923474 A1 | 3/2015 |
| JP | 2005154090 A | 6/2005 |

(Continued)

OTHER PUBLICATIONS

Commonly assigned co-pending U.S. Appl. No. 16/526,004, filed Jul. 30, 2019.

(Continued)

Primary Examiner — Kyle O Logan
(74) Attorney, Agent, or Firm — Gardner, Linn, Burkhart & Ondersma LLP

(57) ABSTRACT

A method of order fulfillment, and system for carrying out the method, includes storing individual items as inventory items in an automated storage and retrieval system and retrieving inventory items from the automated storage and retrieval system in response to an order for those inventory items. The retrieved inventory items are sorted into order batches and transported to an automatic induct for an automated put wall. The order batches are automatically inducted to the automated put wall as individual items. The individual items are segregated for each order at a location on the put wall that is assigned to that order. Individual items for an order are removed together from the automated put wall and transported together to a packing function.

18 Claims, 2 Drawing Sheets

(56) References Cited

U.S. PATENT DOCUMENTS

| | | | |
|---|---|---|---|
| 9,409,664 B1* | 8/2016 | Vliet | B65C 9/40 |
| 9,540,171 B2* | 1/2017 | Elazary | B25J 9/1697 |
| 9,555,967 B2 | 1/2017 | Stevens | |
| 9,604,781 B2 | 3/2017 | Stevens et al. | |
| 10,301,113 B2 | 5/2019 | Stevens et al. | |
| 2004/0234364 A1 | 11/2004 | Ehrenleitner et al. | |
| 2005/0036859 A1 | 2/2005 | Ehrenleitner et al. | |
| 2007/0150383 A1 | 6/2007 | Shakes et al. | |
| 2015/0073589 A1* | 3/2015 | Khodl | B65G 1/1378 700/218 |
| 2015/0086304 A1 | 3/2015 | Hasman et al. | |
| 2015/0217975 A1 | 8/2015 | Khajepour et al. | |
| 2016/0027095 A1 | 1/2016 | Boer et al. | |
| 2016/0229634 A1 | 8/2016 | Yamashita | |
| 2016/0244262 A1 | 8/2016 | O'Brien et al. | |
| 2017/0015502 A1 | 1/2017 | Engel et al. | |

FOREIGN PATENT DOCUMENTS

| | | |
|---|---|---|
| WO | 2008107175 A1 | 9/2008 |
| WO | 2009042611 A2 | 4/2009 |
| WO | 2016022546 A1 | 2/2016 |

OTHER PUBLICATIONS

Commonly assigned co-pending U.S. Appl. No. 16/575,803, filed Sep. 19, 2019.

"Materials Handling" by Karl-Heinz Dullinger, published Dec. 2005.

International Search Report and Written Opinion of the International Searching Authority from corresponding Patent Cooperation Treaty (PCT) Application No. PCT/IB19/56506, indicated completed on Nov. 20, 2019.

* cited by examiner

AUTOMATED ITEM-LEVEL ORDER FULFILLMENT

CROSS REFERENCE TO RELATED APPLICATION

The present application claims priority of U.S. provisional application Ser. No. 62/712,684 filed Jul. 31, 2018, which is hereby incorporated herein by reference in its entirety.

FIELD OF THE INVENTION

The present invention is directed to a method of item-level order fulfillment and, in particular to a method that is substantially fully automated. The invention also includes systems for carrying out the method.

BACKGROUND OF THE INVENTION

Order fulfillment of orders placed over the Internet must take place within a relatively short period of time in order to be commercially competitive. The same could be said for orders received by phone, facsimile, or by the mail based on catalog or television-based merchandising. Such order fulfillment is known as E-commerce and places demands on an order fulfillment system to meet such obligations. This is compounded by the fact that E-commerce usually involves a large number of small orders (each containing as few as one item in the order) that are selected from an inventory with a large number of potential items. Inefficiencies and conflicts arise in warehouses due to the size constraints associated with warehousing and transporting items for order fulfilment, such as the amount of equipment or personnel required to carry out an order fulfilment process, the size of the equipment involved, the size of the items to be manipulated, and other factors. Additional inefficiencies and conflicts arise in sequencing orders and compiling items for orders having multiple items.

SUMMARY OF THE INVENTION

The present invention provides a method of item-level order fulfillment that includes storing items as inventory items in an automated storage and retrieval system (ASRS), such as a shuttle based three-dimensional system. The method utilizes automated robotic systems to automatedly fulfil orders. The method includes presenting individual inventory items to an automated put wall with a pick or put system, such as a cable operated platform, and retrieving an items of an order together from the order location on the automated put wall and transferring that order to a packing function. A system of item-level order fulfillment is provided including an automated storage and retrieval system (ASRS), a picking system, an automatic induct, and an automated put wall to fulfil orders, wherein items stored in the ASRS are retrieved, sorted into batch orders at the picking system, transferred from the picking system to the induct, and presented from the induct to the automated put wall to an order location on the automated put wall.

According to one form of the present invention, a method of item-level order fulfillment includes storing items as inventory items in an automated storage and retrieval system. The method includes retrieving individual inventory items from the ASRS, delivering those items to a batch pick operation in response to an order for one or more of those inventory items, and sorting those inventory items into order batches. The method includes delivering the order batches to an induct of an automated put wall and inducting individual items from the order batches and sorting the individual items into orders located at locations on the automated put wall corresponding to an individual order.

In one aspect of the present invention, the ASRS shuttle based three-dimensional system is preferably adapted to storing and retrieving items two-deep or three-deep on a storage rack. Inventory items are stored in receptacles and the receptacles in which the inventory items are located are retrieved and transported to the batch pick function. At the batch pick function, inventory items are sorted into order batches. The sorting of inventory items into order batches may be performed by a goods-to-person (GTP) or a goods-to-robot (GTR) system. At such GTP or GTR the inventory items retrieved for orders are sorted into batch receptacles such that each receptacle has the items for one or multiple orders in the receptacle. The order batch receptacles are routed to the induct of an automated put wall.

Optionally, items are sorted into order batches with multiple goods-to-person or a goods-to robot systems and routed to an induct of one of a plurality of automated put walls with a routing conveyor, which may be circular to allow empty receptacles to be returned from the automated put wall to the ASRS.

In another aspect of the present invention, individual items are inducted at the induct from the order batch receptacle for sortation into orders at the automated put wall. At the induct, items are removed from order batch receptacles by a robotic arm. Optionally, order batch receptacles may be emptied manually, however, the use of a robotic arm automates and speeds up the process. Since order batch receptacles contain the items for particular orders to be sorted at that particular automated put wall, all items are removed from the receptacle and the empty receptacles can be returned to the GTP or GTR for reuse as batch receptacles.

According to another form of the present invention, a system for item-level order fulfilment includes an automated storage and retrieval system adapted to store inventory items and to retrieve those items for multiple orders and to transfer the retrieved inventory items from the automated storage and retrieval system to a receptacle at a batch order pick system, the receptacle defines a batch order of inventory items for multiple orders. The receptacle is transferred from the batch order pick system to a batch order induct configured to induct individual items from the batch order to an automated put wall. The automated put wall configured to segregate an individual item to a selected location on the automated put wall, the selected location associated with one of the multiple orders. An order retrieval system is provided and is configured to retrieve items for an order together from that order's location on the automated put wall and to transfer those items to a packing station. The orders located at selected locations on the automated put wall comprise at least one of the inventory items stored in the automated storage and retrieval system.

In one aspect, the item-level order fulfilment system includes a batch order transportation router configured to transport said receptacle from said batch order pick system to the induct of the automated put wall. The batch order transportation router may include a conveyor configured to transport batch order receptacles to the induct and to transport empty receptacles back to the batch order pick system after the receptacles have been emptied at the induct.

In another aspect, the automated put wall of the item-level order fulfilment system includes a robotic pick or put system, such as a cable operated platform, configured to automatedly transfer individual items from the induct to a selected location on the automated put wall associated with an order requiring that item.

In another aspect, the order retrieval system of the item-level order fulfilment system is a robotic pick or put system, such as a cable operated platform, configured to automatedly retrieve items of one of the multiple orders together from the selected location on the automated put wall associated with that order. The pick or put system transfers that order to a packing function, such as an automatic packing system.

Optionally, the item-level order fulfilment system includes a plurality of ASRS, a plurality of batch order pick systems, a plurality of automated put walls having dedicated inducts, all coordinated to fulfil orders with individual items that may be stored in one of the plurality of ASRS and transported to one of the plurality of automated put walls. A single batch order transportation router may transport receptacles from the plurality of batch order pick systems to one of the plurality of automated put walls.

Therefore, the present invention provides a method, and a system for carrying out the method, for item-level order fulfilment that is substantially automated. The method utilizes an automated storage and retrieval system and a pick or put system to substantially automatedly fulfil an order. The ASRS may be adapted to retrieve receptacles from a rack having two-deep and three-deep receptacles. The pick or put system may include a cable operated platform to both place items to a location on an automated put wall and retrieve items of an order together from a selected location on the automated put wall. The method is capable of segregating individual items received at an induct of the automated put wall and putting that individual item to a selected location on the automated put wall without an intermediate function to remove and segregate items from a batch of items received from the ASRS.

These and other objects, advantages, purposes, and features of the present invention will become more apparent upon review of the following specification in conjunction with the drawings.

DETAILED DESCRIPTION OF THE PREFERRED EMBODIMENT

Figure 1:
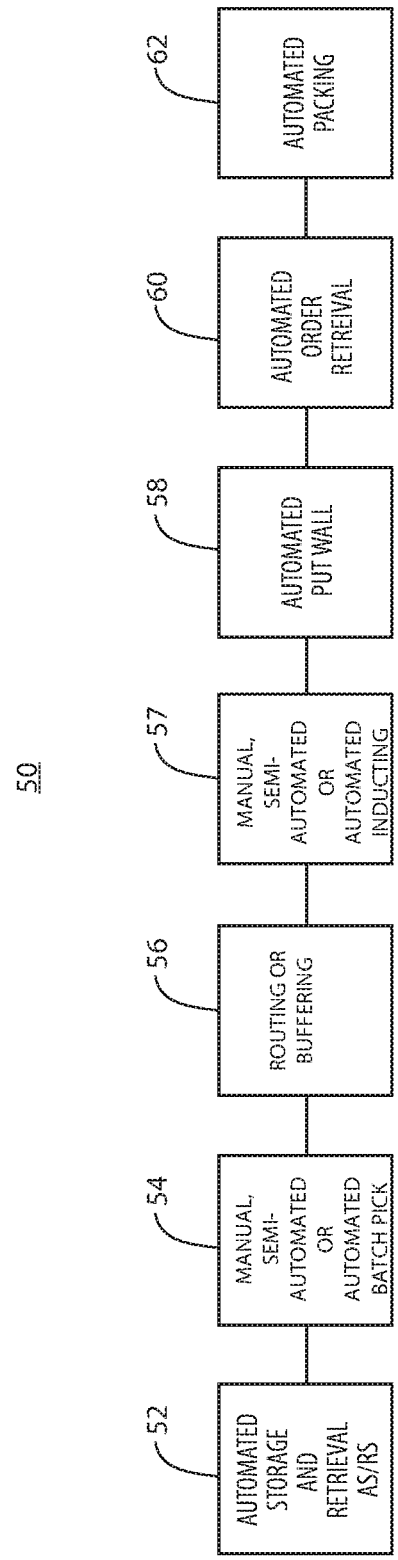
FIG. 1 is a block diagram of a method of item-level order fulfillment according to an embodiment of the invention.

Referring now to the drawings and the illustrative embodiment depicted therein, a system 10 and a method 50 of item-level order fulfillment includes an automated storage and retrieval system (ASRS) 12, a picking system 14, an induct 16, and an automated put wall 18. The ASRS 12 stores inventory items to fulfil multiple orders and retrieves the inventory items from the ASRS 12 that are required for an order. Picking system 14 picks items that are retrieved from the ASRS 12 and transfers them to the induct 16. The induct 16 presents the items from the picking system 14 to the automated put wall 18. The Automated put wall 18 automatedly segregates the individual items in each order to a location on the put wall 18 that is assigned to that order under the control of a warehouse management system (not shown) or the like. The individual items for an order are removed together from the automated put wall 18 and transported, such as with a conveyor 20 together to a packing function (not shown). The packing function preferably is an automatic packing machine. An example of an automated put wall 18 may be of the type disclosed in U.S. non-provisional application Ser. No. 16/526,004, by Michael Khodl and Philip Puite for AUTOMATED ITEM-LEVEL ORDER FULFILLMENT, the disclosure of which is hereby incorporated herein by reference in its entirety.

The individual items for an order are removed together by being withdrawn from at least one bin of automated put wall 18 with a robotic pick or put system 22. In the illustrated embodiment, robotic pick or put system 22 is a cable operated platform of the type disclosed in United States Patent Application Publication No. 2015/0217975, the disclosure of which is hereby incorporated herein by reference in its entirety. The cable operated platform retrieves an order from a location on the automated put wall 18 and forwards the order to the packing function via conveyor 20. Alternatively, other types of robotic pick or put system could be used such as a robotic arm or the like.

In the illustrated embodiments, a method of item-level order fulfillment 50 includes storing items 52 as inventory items in an automated storage and retrieval system (ASRS) 12. While a variety of ASRS are known in the art, in the illustrated embodiment, the automated storage and retrieval system 12 is a shuttle based three-dimensional system. Such shuttle based three-dimensional system is preferably adapted to storing and retrieving items two-deep or three-deep on a storage rack such as disclosed in commonly assigned U.S. Pat. No. 8,790,061, the disclosure of which is hereby incorporated herein by reference in its entirety. In the ASRS 12, disclosed in the '061 patent, inventory items are stored in receptacles and the receptacles in which the inventory items are located are retrieved and delivered to a batch pick operation 54 in response to an order for one or more of those inventory items.

Figure 2:
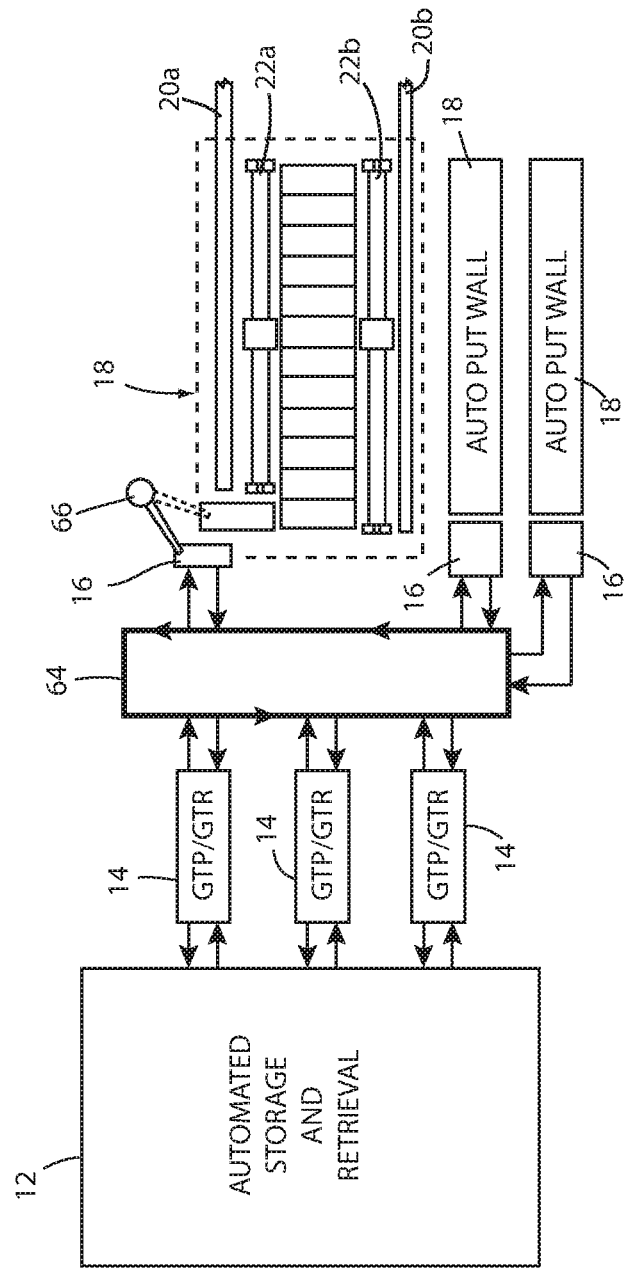
FIG. 2 is a schematic view of the embodiment in FIG. 1.

At batch pick function 54 inventory items are sorted into order batches. The sorting of inventory items into order batches is performed in the illustrated embodiment with a goods-to-person (GTP) or a goods-to-robot (GTR) system of the type disclosed in commonly assigned U.S. Pat. No. 8,713,899, the disclosure of which is hereby incorporated herein by reference in its entirety. At such GTP or GTR the inventory items retrieved for orders are sorted into batch receptacles such that each receptacle has the items for one or multiple orders in the receptacle. The order batch receptacles are routed at 56 to the induct of an automated put wall. In the illustrated embodiment, inventory items are sorted into order batches with multiple goods-to-person or a goods-to robot systems at 54 and routed at 56 to the induct at 57 of one of a plurality of automated put walls 58 with a routing conveyor 64, which may be circular to allow empty receptacles to be returned from the automated put wall to the ASRS, as illustrated in FIG. 2. Complete orders are sent to automated packing 62, such as on a conveyor 20.

At induct 16, individual items are inducted from the order batch receptacle for the sortation into orders at the automated put wall 18. Items are removed from order batch receptacles at the induct 16 by a robotic arm 66. While it would be possible to have order batch receptacles emptied manually, the use of robotic arm 66 automates and speeds up the process. Since order batch receptacles contain the items for particular orders to be sorted at that particular automated put wall 18, empty receptacles are returned to the GTP or GTR 14 for reuse as batch receptacles.

In the illustrated embodiment, shown in FIG. 2, a first robotic pick or put system 22a of automated put wall 18 delivers individual items from the induct 16 to selected bins in two order racks, one on either side of a center aisle (not shown). Two robotic pick or put systems 22a, 22b are provided in the embodiment illustrated in FIG. 2, each capable of withdrawing the items from order bins of ones of the order racks and transferring the items of orders together to a corresponding conveyor 20a, 20b for transport to the packing function.

In another embodiment, the method of item-level order fulfillment 50a includes an automated put wall provided by a manual put wall (not shown) of the type known in the art and a robotic pick or put system 22. Robotic pick or put system 22a, which may be a cable operated platform, receives individual items from an induct 16, that sorts the items to a particular bin within the manual put wall. Another robotic pick or put system 22b withdraws the items for one or more order bins that together make up an order and transfers the items of the order together to a conveyor 20 for transport to the packing function.

In yet another embodiment, the method of item-level order fulfilment 50b uses a human operator to manually unload the bins of completed orders from a manual put wall (not shown) and provide the orders to a packing function or perform the packing function at the same time. Method of item-level order fulfillment 50b using a human operator is not as fast or efficient as method of item-level order fulfillment 50 or 50a but may find application where a lower rate of order fulfillment is all that is required.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of item-level order fulfillment, said method comprising:
    storing items as inventory items in an automated storage and retrieval system;
    retrieving inventory items from the automated storage and retrieval system in response to an order for those inventory items;
    sorting inventory items into one or more order batches with a batch order picking system;
    routing the one or more order batches with a routing conveyor, wherein the routing conveyor is configured for transporting order batches and buffering order batches;
    selectively delivering one of the order batches, with the routing conveyor, to an induct at an automated put wall;
    inducting individual items from the order batch at the induct for sortation into one or more orders at the automated put wall;
    removing the individual items for an order together from the automated put wall with a robotic pick or put system configured to retrieve items from the automated put wall; and
    transporting those items together to an automated packing function.

2. The method of item-level order fulfillment as claimed in claim 1, further comprising presenting individual items for multiple orders to the automated put wall and segregating the individual items for each order at a location on the put wall that is assigned to that order.

3. The method of item-level order fulfillment as claimed in claim 2, wherein said segregating the individual items for each order at a location on the put wall comprises putting the individual items to at least one receptacle of the automated put wall with a robotic pick or put system configured to put individual items to the automated put wall.

4. The method of item-level order fulfillment as claimed in claim 3, wherein said robotic pick or put system places an individual item for an order at a location on the automated put wall associated with that order with one chosen from (i) an ASRS extractor, (ii) a robotic extractor, or (iii) a cable operated platform.

5. The method of item-level order fulfillment as claimed in claim 1, wherein said automated storage and retrieval system comprises a shuttle based three-dimensional system.

6. The method of item-level order fulfillment as claimed in claim 5, wherein said shuttle is adapted to storing and retrieving items on a storage rack.

7. The method of item-level order fulfillment as claimed in claim 5, wherein said shuttle is adapted to storing and retrieving receptacles containing individual items two-deep or three-deep on a storage rack.

8. The method of item-level order fulfillment as claimed in claim 1, wherein inventory items are stored in receptacles and retrieving inventory items comprises retrieving the receptacles in which the inventory items are located.

9. The method of item-level order fulfillment as claimed in claim 1, wherein the batch order picking system comprises a goods-to-person or a goods-to robot system for sorting inventory items into order batches.

10. The method of item-level order fulfillment as claimed in claim 1, wherein the delivering of order batches includes delivering the order batches in receptacles.

11. The method of item-level order fulfillment system as claimed in claim 1, wherein inducting of individual items for the order batches at the induct is performed by a robot cell.

12. The method of item-level order fulfillment as claimed in claim 1, wherein the robotic pick or put system configured to retrieve an order from a location on the automated put wall and forwards the order to the automated packing function.

13. The method of item-level order fulfillment as claimed in claim 1, wherein said robotic pick or put system configured to retrieves an order from a location on the automated put wall with one chosen from (i) an ASRS extractor, (ii) a robotic extractor, or (iii) a cable operated platform.

14. The method of item-level order fulfillment as claimed in claim 1, wherein said sorting inventory items into order batches is performed with one of a plurality of goods-to-person or goods-to robot systems, said inducting individual items from the order batches is performed at the induct for sortation into orders at one of a plurality of automated put walls, and said delivering the order batches comprises selectively routing order batches from one of the goods-to-person or goods-to-robot systems to the induct of one of the automated put walls.

15. An item-level order fulfillment system comprising:
an automated storage and retrieval system adapted to store inventory items and to retrieve those items for multiple orders;
a batch order pick system to transfer the retrieved inventory items from said automated storage and retrieval system to a receptacle that defines a batch order receptacle containing inventory items for multiple orders;
a batch order transportation router comprising a routing conveyor, said transportation router configured to transport and/or buffer said batch order receptacle from said batch order pick system to an automated put wall;
a batch order induct to induct individual items from the batch order receptacle to an automated put wall in which each individual item is segregated to one of a plurality of locations on said automated put wall, at least some of the locations each associated with one of the multiple orders; and
an order retrieval system configured to retrieve items for an order together from that order's location on said automated put wall and to transfer those items to a packing station;
wherein the orders located at locations on said automated put wall comprise at least one of the inventory items which was stored in said automated storage and retrieval system.

16. The item-level order fulfillment system as claimed in claim 15, wherein said automated put wall further comprises a robotic pick or put system adapted to put an individual item to the location on said automated put wall.

17. The item-level order fulfillment system as claimed in claim 15, wherein said order retrieval system further comprises a robotic pick or put system adapted to remove the individual items for an order together.

18. The item-level order fulfillment system as claimed in claim 15, further comprising a robotic pick or put system in transport communication with each of said order retrieval system and said batch order induct, wherein said robotic pick or put system is adapted to induct individual items from the batch order receptacle to an automated put wall and adapted to remove the individual items for an order together from the automated put wall.

* * * * *